(12) United States Patent
Pang

(10) Patent No.: US 10,576,358 B2
(45) Date of Patent: Mar. 3, 2020

(54) SWING ROLLER SKATE WITH NOVEL MANUFACTURING PROCESS

(71) Applicant: TAICANG CHE ZHONG BAO LEISURE PRODUCTS CO., LTD., Taicang, Jiangsu (CN)

(72) Inventor: Mingfang Pang, Jiangsu (CN)

(73) Assignee: TAICANG CHE ZHONG BAO LEISURE PRODUCTS CO., LTD., Taicang, Jiangsu (CN)

( * ) Notice: Subject to any disclaimer, the term of this patent is extended or adjusted under 35 U.S.C. 154(b) by 0 days.

(21) Appl. No.: 15/745,713

(22) PCT Filed: Dec. 28, 2015

(86) PCT No.: PCT/CN2015/099116
§ 371 (c)(1),
(2) Date: Jan. 18, 2018

(87) PCT Pub. No.: WO2017/012272
PCT Pub. Date: Jan. 26, 2017

(65) Prior Publication Data
US 2019/0336845 A1    Nov. 7, 2019

(30) Foreign Application Priority Data

Jul. 17, 2015 (CN) .......................... 2015 1 0420715

(51) Int. Cl.
*A63C 17/00* (2006.01)
*A63C 17/02* (2006.01)
*A63C 17/22* (2006.01)
*B21C 23/14* (2006.01)
*B23K 9/16* (2006.01)

(52) U.S. Cl.
CPC .......... *A63C 17/0033* (2013.01); *A63C 17/02* (2013.01); *A63C 17/226* (2013.01); *B21C 23/14* (2013.01); *B23K 9/16* (2013.01)

(58) Field of Classification Search
CPC ..... A63C 17/0033; A63C 17/02; A63C 17/22; A63C 17/226; B21C 23/14; B23K 9/16
USPC ...................................................... 280/11.25
See application file for complete search history.

(56) References Cited

U.S. PATENT DOCUMENTS

| 7,484,742 B2 * | 2/2009 | Choi ................... A63C 17/0033 |
| | | 280/11.223 |
| 2016/0008698 A1 * | 1/2016 | Pang .................... A63C 17/013 |
| | | 280/11.25 |

* cited by examiner

*Primary Examiner* — John D Walters

(57) ABSTRACT

A swing roller skate with a novel manufacturing process includes: an aluminum insert, a panel, an anti-wear bar, a lower bearing, an upper bearing, an insert plastic wheel fork, a PU wheel and an insert cap, wherein: the aluminum insert is injection-molded into the panel; a front portion of the panel forms a pole, a front end forms a cylinder, a rear portion forms a flat cylinder, a rear end forms a cylinder, and a middle forms a circular sheet; top side holes and bottom side holes are drilled at the front end and the rear end of the panel, and through holes are provided between the top side holes and the bottom side holes; two oval holes are drilled at a circular bottom face of the plane, the anti-wear bar is provided at two sides of a bottom face of the middle portion of the plane.

13 Claims, 3 Drawing Sheets

SWING ROLLER SKATE WITH NOVEL MANUFACTURING PROCESS

CROSS REFERENCE OF RELATED APPLICATION

This is a U.S. National Stage under 35 U.S.C 371 of the International Application PCT/CN2015/099116, filed Dec. 28, 2015, which claims priority under 35 U.S.C. 119(a-d) to CN 201510420715.7, filed Jul. 17, 2015.

BACKGROUND OF THE PRESENT INVENTION

Field of Invention

The present invention relates to entertainment equipment, and more particularly to a swing roller skate with a novel manufacturing process, a perfect appearance and a modern sense.

Description of Related Arts

According to swing roller skates with a concave plastic panel and swing roller skates with engaged upper and lower panels previously designed by the applicant, the panels are simply plastic, which must reach a certain thickness to meet the strength requirements. Therefore, more plastic materials should be used and the appearance also appears heavy. Cost and appearance can be further improved especially in manufacturing process, which means swing roller skates with a perfect appearance and a modern sense can be produced by using a novel manufacturing process.

SUMMARY OF THE PRESENT INVENTION

An object of the present invention is to provide swing roller skates a perfect appearance and a modern sense by using a novel manufacturing process, wherein materials can be saved and a final product is delicate. Accordingly, in order to accomplish the above object, the present invention provides a swing roller skate with a novel manufacturing process, comprising: an aluminum insert, a panel, an anti-wear bar, a lower bearing, an upper bearing, an insert plastic wheel fork, a PU (polyurethane) wheel and an insert cap, wherein: the aluminum insert is formed by bending an H-shaped aluminum profile into a U-shape and obliquely drilling a row of round through holes on a front end and a rear portion of a formed insert respectively along an up-down direction; an oblique direction of the round through holes on the front end and the rear portion of the aluminum insert forms a forward angle of 79.5° with a horizontal portion of the U-shape; then the aluminum insert is injection-molded into the panel; the panel is form by plastic injection molding; a front portion of the panel forms a pole; an upper cross section of the pole is semi-circular, and a lower cross section of the pole is a bottom half of a flat oval; the pole of the panel is curved and extends upwards; a front end of the panel is integrally connected to a vertical front cylinder which is smaller in a top and larger in a bottom; a front end of the pole of the panel, which is connected to the vertical front cylinder, is match-shaped with a larger front and a smaller rear; the pole at the front end of the panel obliques forwards with an angle of 79.5°; a front top side hole and a front bottom side hole are drilled at the front end of the panel, and a front through hole is provided between the front top side hole and the front bottom side hole; a rear portion of the panel is a flat cylinder vertically extending upwards; a front half of a horizontal cross section of the flat cylinder at the rear portion of the panel is semi-circular, and a rear half of the horizontal cross section is a rear half of the flat oval; a top end of the flat cylinder of the panel extends backwards and is integrally connected to a vertical rear cylinder which is smaller in a top and larger in a bottom; the vertical rear cylinder at a rear end of the panel obliques forwards with an angle of 79.5°; a rear top side hole and a rear bottom side hole are drilled at the rear end of the panel, and a rear through hole is provided between the rear top side hole and the rear bottom side hole; a center connecting line of the front top side hole and the front bottom side hole, as well as a center connecting line of the rear top side hole and the rear bottom side hole, respectively form a forward angle of 79.5° with a circular bottom face of the panel; the circular bottom face is integrally connected to a middle portion of the panel between the pole and the flat cylinder; an oval hole is vertically drilled at two sides of a middle of the circular bottom face respectively, and an external bottom portion of the oval hole of the circular bottom face has a concave facing upwards; screw holes are provided at two ends of the concave, which respectively form a forward oblique with the circular bottom face of the panel with an angle of 79.5°; a first row of forward oblique through holes are drilled at a contacting area of the front end of the pole of the panel and the vertical front cylinder along the up-down direction, so to as to correspond to the round through holes at the front end of the aluminum insert; a second row of forward oblique through holes are drilled at the rear portion of the circular bottom face of the panel, so as to correspond to the round through holes at the rear portion of the aluminum insert; a first stopper is inserted into each of the forward oblique through holes at the front end of the panel from top to bottom, and a second stopper is inserted into each of the forward oblique through holes at the rear portion of the circular bottom face of the panel from top to bottom; a first arc concave connecting edge is provided at a left side and a right side of a contacting area of the pole at the front end of the panel and the circular bottom face respectively, and a second arc concave connecting edge is provided at a left side and a right side of a contacting area of the flat cylinder vertically extending upwards at the rear portion of the panel and the circular bottom face respectively; an arc paved bevel is formed at a front side of a top portion of the flat cylinder vertically extending upwards at the rear portion of the panel; a left side and a right side of an upper circumference of the circular bottom face of the panel are arc-edged; a lower circumference of the circular bottom face of the panel is arc-edged; an upper circumference and a lower circumference of the oval hole of the circular bottom face of the panel are arc-edged; a front side, a left side and a right side of a top face of the vertical front cylinder at the front end of the panel are arc-edged; a rear side, a left side and a right side of a top face of the vertical rear cylinder at the rear end of the panel are arc-edged; a front side, a left side and a right side of a bottom face of the vertical front cylinder at the front end of the panel are arc-edged; a rear side, a left side and a right side of a bottom face of the vertical rear cylinder at the rear end of the panel are arc-edged; anti-slip grains are arranged around a top side of the oval hole of the circular bottom face of the panel, which are conical; the anti-wear bar is a bar-shaped nylon unit, and a connecting through hole is drilled and upwardly provided at two ends of the anti-wear bar; two the anti-wear bars are fixed by four screw holes at the concave of the external bottom portion of the oval hole of the panel through four self-tapping bolts; the lower bearing is a mode 628 deep groove ball bearing, and the upper bearing is a mode 608 deep groove ball bearing; two the lower bearings are respectively embedded in the front top side hole and the rear top side hole of the panel; the insert plastic wheel fork comprises a wheel fork insert and a plastic wheel fork; the wheel fork insert is formed by a metal wheel fork and a locking bolt screw barrel; the metal wheel fork is formed by stamping a flat metal strip into an n-shape; two opposite through holes with a diameter of φ8 mm are drilled at side faces of two bottom ends of the metal wheel fork; the bottom ends of the metal wheel fork are round-cornered; a top portion of the metal wheel fork is welded on the locking bolt screw barrel by spot welding, which is then reinforced by argon arc welding; a diameter of the locking bolt screw barrel is φ8 mm; after being welded with the metal wheel fork, an axis of the locking bolt screw barrel is 27 mm away from a connecting line of the opposite through holes of the bottom ends of the metal wheel fork; the metal wheel fork of the wheel fork insert is injection-molded in the plastic wheel fork, and a pole of the locking bolt screw barrel of the wheel fork insert is fully exposed outside the plastic wheel fork; the plastic wheel fork is connected to the wheel fork insert by injection molding, wherein a top face of a top portion of the plastic wheel fork is spherical and extends upwards, and a bottom face of the top portion of the plastic wheel fork is n-shaped; two sides of the plastic wheel fork extend downwards and are integrally connected to two fork pieces which are slightly wider in a top and slightly narrower in a bottom, and the fork pieces are arc faces extending outwards; a bottom end of the fork pieces of the plastic wheel fork is a downward semicircle whose external edge is round-cornered; two horizontal holes are drilled at external sides of the bottom ends of the fork pieces of the plastic wheel fork, which inwardly communicate with two horizontal through holes; a center connecting line of the horizontal through holes of the plastic wheel fork is perpendicular to an axis extension cord of the locking bolt screw barrel of the wheel fork insert; two convex rings are provided at internal ends of the horizontal through holes of the plastic wheel fork; the PU wheel comprises two bearings at centers of both sides, and is connected to the horizontal through holes of the insert plastic wheel fork through a locking bolt; four shafts of the insert plastic wheel fork are inserted into four the lower bearings and four the upper bearings at the front ends and the rear ends of two the panels, and are screwed into the screw holes of the top portions of the locking bolt screw barrels by flat base bolts of four the insert caps for positioning; the insert cap is formed by injection-molding a plastic round cap into a top head of a flat base hex bolt; a round hole is drilled at a center of a top portion of the insert cap, which corresponds to and communicates with a hex hole at the top head of the flat base hex bolt; four the insert caps are screwed into the screw holes of four pairs of the locking bolt screw barrels, and are placed at top portions of the front top side hole and the rear top side hole of the panel.

Beneficial effects of the present invention are as follows. The aluminum insert is injection-molded into the panel, in such a manner that the front and rear portions of the panel are pole-shaped. The forward oblique round through holes are drilled at the front end and the rear portion of the aluminum insert in the up-down direction, and an oblique direction matches the angle formed by the connecting line of the top side holes and the bottom side holes at the front and rear ends of the panel, in such a manner that an injection mold of the panel only needs an upper mold and a lower mold while no core mold is needed, which simplifies injection molding of the panel and accelerates injection mold releasing. The middle portion of the panel is a circular sheet with the oval hole, which is modern and delicate while desired strength is guaranteed. The anti-wear bar is a flat strip-like nylon unit, which is connected to the bottom portion at the external side of the oval holes at a bottom face of the present invention through bolts. The present invention has a better overall appearance, and can be hung on a waist belt by crossing a key ring in the oval holes, which is easy to carry. An additional pair of the anti-wear bars is provided for the present invention for replacement after being worn. The insert plastic wheel fork is adopted, wherein the wheel fork insert is used as a frame to bear forces while the plastic wheel fork provides a delicate and smooth appearance, so as to ensure both a sufficient strength and a good appearance. Furthermore, the appearance will be even better with cooperation of the panel. The insert cap is formed by injection-molding a plastic round cap into a top portion of the flat base bolt, wherein the plastic round cap can be positioned in the front and rear top side holes of the panel after placing the flat base bolt into the locking bolt screw barrel. In addition, a column stopper is inserted into the round hole of the insert cap, making the appearance of the present invention even better. The present invention can be lighter, thinner, smaller and shorter, so as to provide a lighter weight and a science fiction appearance.

Element reference: 1—aluminum insert, 2—panel, 3—anti-bar, 4—insert plastic wheel fork, 5—PU wheel, 6—insert cap, 41—wheel fork insert, 42—plastic wheel fork, 411—metal wheel fork, 412—locking bolt screw barrel.

DETAILED DESCRIPTION OF THE PREFERRED EMBODIMENT

Figure 1:
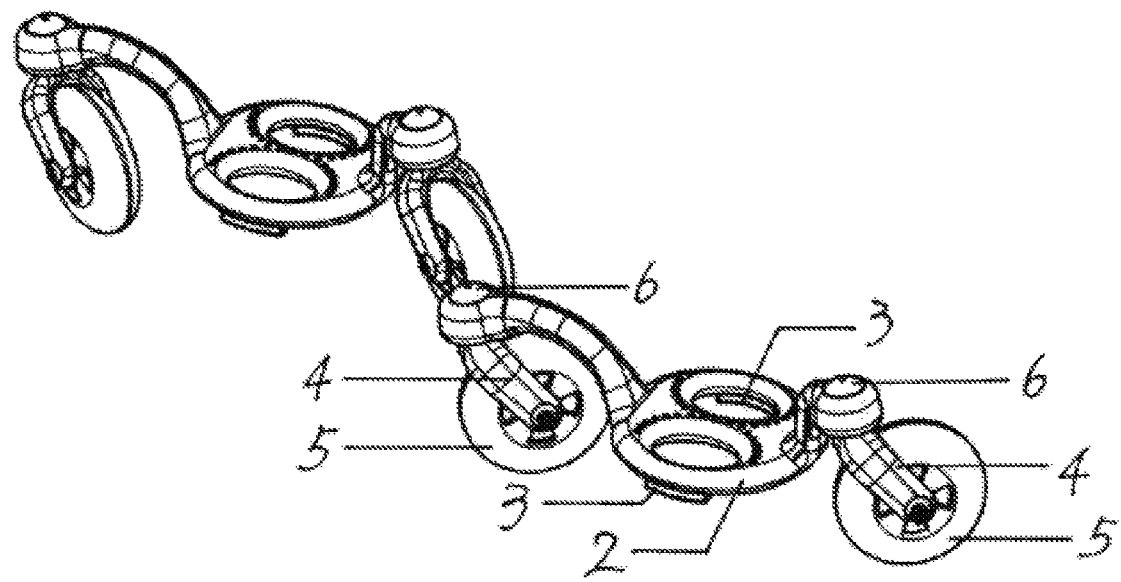
FIG. 1 is a sketch view of moving the present invention forward by swinging a front foot to a right while swinging a rear foot to a left.
Figure 2:
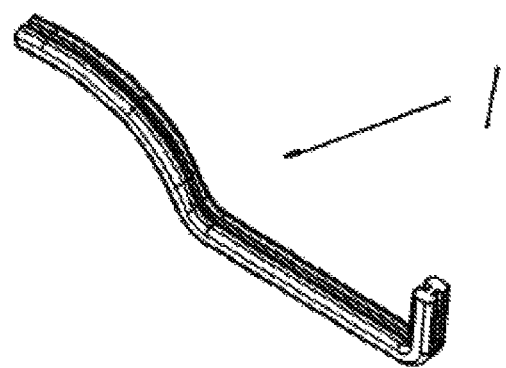
FIG. 2 is a structural view of an aluminum insert of the present invention.
Figure 3:
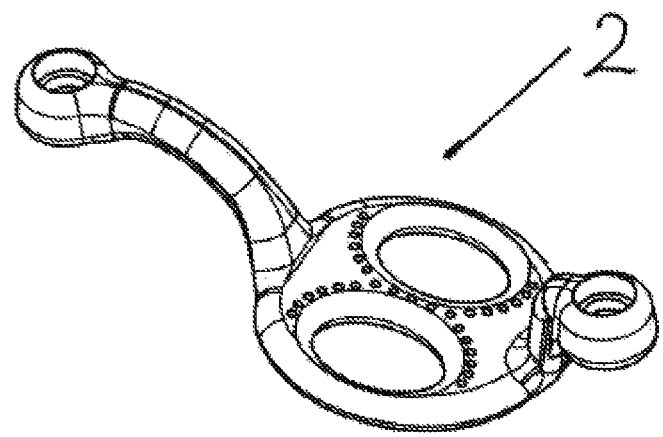
FIG. 3 is a structural view of a panel of the present invention.
Figure 4:
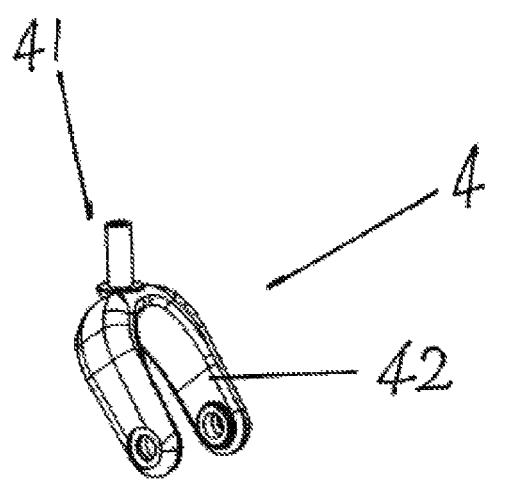
FIG. 4 is a structural view of an insert plastic wheel fork of the present invention.
Figure 5:
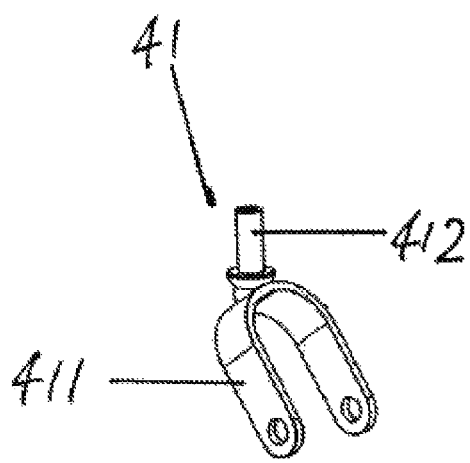
FIG. 5 is a structural view of a wheel fork insert of the present invention.
Figure 6:
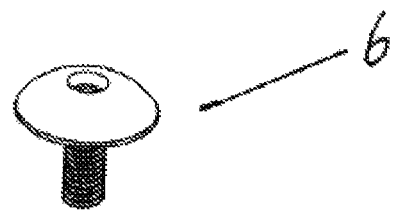
FIG. 6 is a structural view of an insert cap of the present invention.
Figure 7:
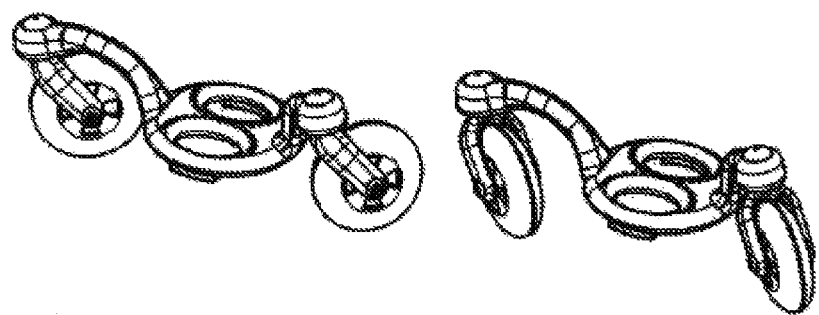
FIG. 7 is a sketch view of the present invention when the front foot swings to the left and the rear foot swings to the right.

Referring to FIGS. 1, 3, 4, 5 and 6, a swing roller skate with a novel manufacturing process, comprising: an aluminum insert 1, a panel 2, an anti-wear bar 3, a lower bearing, an upper bearing, an insert plastic wheel fork 4, a PU wheel 5 and an insert cap 6;

wherein: the aluminum insert 1 is formed by bending an H-shaped aluminum profile into a U-shape; the H-shaped aluminum profile for the aluminum insert 1 is an H-shaped aluminum extruding profile with a height of 9 mm and a width of 13 mm; the H-shaped aluminum profile has an upper groove, a lower groove and four round corners; a depth of both the upper groove and the lower groove of the H-shaped aluminum profile is 2.8 mm; a front portion of the U-shape of the aluminum insert 1 extends upwards and is arc-shaped, and a rear portion of the U-shape of the aluminum insert 1 vertically extends upwards; a long hole is drilled at a top portion vertically extending upwards of the rear portion of the aluminum insert 1, which is placed in an upper groove and a lower groove of the aluminum insert 1; a row of round through holes are obliquely drilled on a front end and a rear portion of a formed insert respectively along an up-down direction; an oblique direction of the round through holes on the front end and the rear portion of the aluminum insert 1 forms a forward angle of 79.5° with a horizontal portion of the U-shape; then the aluminum insert 1 is injection-molded into the panel 2; the aluminum insert 1 injection-molded into the panel 2 is placed at a longitudinal middle of the panel 2.

The panel 2 is form by plastic injection molding; a front portion of the panel 2 forms a pole; an upper cross section of the pole is semi-circular, and a lower cross section of the pole is a bottom half of a flat oval; the pole of the panel 2 is curved and extends upwards, which corresponds to the arc-shaped upwards front portion of the aluminum insert 1; a front end of the panel 2 is integrally connected to a vertical front cylinder which is smaller in a top and larger in a bottom; a front end of the pole of the panel 2, which is connected to the vertical front cylinder, is match-shaped with a larger front and a smaller rear; the pole at the front end of the panel 2 obliques forwards with an angle of 79.5°; a front top side hole and a front bottom side hole are drilled at the front end of the panel 2, wherein the front top side hole of the panel 2 has a diameter of φ22 mm and a depth of 9 mm; the front bottom side hole of the panel 2 has a diameter of φ24 mm and a depth of 8 mm; a front through hole is provided between the front top side hole and the front bottom side hole. A rear portion of the panel 2 is a flat cylinder vertically extending upwards; a front half of a horizontal cross section of the flat cylinder at the rear portion of the panel 2 is semi-circular, and a rear half of the horizontal cross section is a rear half of the flat oval; the flat cylinder vertically extending upwards cooperates with the rear portion of the aluminum insert 1 which vertically extends upwards; a top end of the flat cylinder of the panel 2 extends backwards and is integrally connected to a vertical rear cylinder which is smaller in a top and larger in a bottom; the vertical rear cylinder at a rear end of the panel 2 obliques forwards with an angle of 79.5°; a rear top side hole and a rear bottom side hole are drilled at the rear end of the panel 2, wherein the rear top side hole of the panel 2 has a diameter of φ22 mm and a depth of 9 mm; the rear bottom side hole of the panel 2 has a diameter of φ24 mm and a depth of 8 mm; a rear through hole is provided between the rear top side hole and the rear bottom side hole. A center connecting line of the front top side hole and the front bottom side hole, as well as a center connecting line of the rear top side hole and the rear bottom side hole, respectively form a forward angle of 79.5° with a circular bottom face of the panel 2; the circular bottom face is integrally connected to a middle portion of the panel 2 between the pole and the flat cylinder; an oval hole is vertically drilled at two sides of a middle of the circular bottom face respectively, and an external bottom portion of the oval hole of the circular bottom face has a concave facing upwards; screw holes are provided at two ends of the concave, which respectively form a forward oblique with the circular bottom face of the panel 2 with an angle of 79.5°; a first row of forward oblique through holes are drilled at a contacting area of the front end of the pole of the panel 2 and the vertical front cylinder along the up-down direction, so as to correspond to the round through holes at the front end of the aluminum insert 1; a second row of forward oblique through holes are drilled at the rear portion of the circular bottom face of the panel 2, so as to correspond to the round through holes at the rear portion of the aluminum insert 1; a first stopper is inserted into each of the forward oblique through holes at the front end of the panel 2 from top to bottom, and a second stopper is inserted into each of the forward oblique through holes at the rear portion of the circular bottom face of the panel 2 from top to bottom; wherein a top end of the first stopper inserted into each of the forward oblique through holes at the front end of the panel 2, and a top end of the second stopper inserted into each of the forward oblique through holes at the rear portion of the panel 2 are leveled with a top surface of the panel 2. A first arc concave connecting edge is provided at a left side and a right side of a contacting area of the pole at the front end of the panel 2 and the circular bottom face respectively, and a second arc concave connecting edge is provided at a left side and a right side of a contacting area of the flat cylinder vertically extending upwards at the rear portion of the panel 2 and the circular bottom face respectively; an arc paved bevel is formed at a front side of a top portion of the flat cylinder vertically extending upwards at the rear portion of the panel 2; a left side and a right side of an upper circumference of the circular bottom face of the panel 2 are arc-edged; a lower circumference of the circular bottom face of the panel 2 is arc-edged; an upper circumference and a lower circumference of the oval hole of the circular bottom face of the panel 2 are arc-edged; a front side, a left side and a right side of a top face of the vertical front cylinder at the front end of the panel 2 are arc-edged; a rear side, a left side and a right side of a top face of the vertical rear cylinder at the rear end of the panel 2 are arc-edged; a front side, a left side and a right side of a bottom face of the vertical front cylinder at the front end of the panel 2 are arc-edged; a rear side, a left side and a right side of a bottom face of the vertical rear cylinder at the rear end of the panel 2 are arc-edged; anti-slip grains are arranged around a top side of the oval hole of the circular bottom face of the panel 2, which are conical; wherein circular convex ribs facing downwards are longitudinally provided at a middle of the circular bottom face of the panel 2, provided around a bottom side of the oval holes of the circular bottom face of the panel 2, as well as provided at a front end and a rear end of a bottom portion of the circular bottom face 2, which are connected to each other.

The anti-wear bar 3 is a bar-shaped nylon unit, which is formed by modified nylon injection molding; and a connecting through hole is drilled and upwardly provided at two ends of the anti-wear bar 3; connecting through holes at a bottom face of the anti-wear bar 3 correspond to the screw holes upwardly provided at the concave of the panel 2, and the anti-wear bar 3 is fixed by screw holes at the bottom portion of the panel 2 through self-tapping bolts.

The lower bearing is a mode 628 deep groove ball bearing, and the upper bearing is a mode 608 deep groove ball bearing; two the lower bearings are respectively embedded in the front top side hole and the rear top side hole of the panel 2. Four plastic rings are respectively placed in the front through hole between the front top side hole and the front bottom side hole, and the rear through hole between the rear top side hole and the rear bottom side hole; the four plastic rings are placed on four the lower bearings; four the upper bearings are embedded in the front top side hole and the rear top side hole of the panel 2, and are placed on the four plastic rings.

The insert plastic wheel fork 4 comprises a wheel fork insert 41 and a plastic wheel fork 42; the wheel fork insert 41 is formed by a metal wheel fork 411 and a locking bolt screw barrel 412, wherein the metal wheel fork 411 is formed by stamping a 3 mm×16 mm flat metal strip into an n-shape. Two opposite through holes with a diameter of φ8.4 mm are drilled at side faces of two bottom ends of the metal wheel fork 411; the bottom ends of the metal wheel fork 411 are round-cornered; a top portion of the metal wheel fork 411 is welded on the locking bolt screw barrel 412 by spot welding, which is then reinforced by argon arc welding; a diameter of the locking bolt screw barrel 412 is φ8 mm, wherein an axial threaded hole is drilled at a middle at a top end of the locking bolt screw barrel 412, which is an M6 threaded hole. After being welded with the metal wheel fork 411, an axis of the locking bolt screw barrel 412 is 27 mm away from a connecting line of the opposite through holes of the bottom ends of the metal wheel fork 411; the metal wheel fork 411 of the wheel fork insert 41 is injection-molded in the plastic wheel fork 42, and a pole of the locking bolt screw barrel 412 of the wheel fork insert 41 is fully exposed outside the plastic wheel fork 42.

The plastic wheel fork 42 is formed by plastic injection molding, and is connected to the wheel fork insert 41 by injection molding, wherein a top face of a top portion of the plastic wheel fork 42 is spherical and extends upwards, and a bottom face of the top portion of the plastic wheel fork 42 is n-shaped; two sides of the plastic wheel fork 42 extend downwards and are integrally connected to two fork pieces, wherein internal sides of the two fork pieces of the plastic wheel fork 42 are flat with an interval of 27 mm; a thickness between the internal side and an external side of each of the fork pieces is 7 mm. The two plastic pieces are slightly wider in a top and slightly narrower in a bottom; a bottom end of the fork pieces of the plastic wheel fork 42 is a downward semicircle whose external edge is round-cornered; two horizontal holes are drilled at external sides of the bottom ends of the fork pieces of the plastic wheel fork 42, wherein the horizontal holes at the external sides of the bottom ends of the fork pieces of the plastic wheel fork 42 have a diameter of φ13.5 mm. The horizontal holes of the plastic pieces of the plastic wheel fork 42 inwardly communicate with two horizontal through holes, wherein the horizontal through holes of the plastic wheel fork 42 has a diameter of φ8 mm. A center connecting line of the horizontal through holes of the plastic wheel fork 42 is perpendicular to an axis extension cord of the locking bolt screw barrel 412 of the wheel fork insert 41, and the center connecting line of the horizontal through holes of the plastic wheel fork 42 is 27 mm away from and is behind the axis extension cord of the locking bolt screw barrel 412. Each of the fork pieces has a thicker front and a thinner rear to form a wedge shape for mold releasing; the bottom face of the top portion of the plastic wheel fork 42 is n-shaped and is lower in a front and higher in a rear. Two convex rings are provided at internal ends of the horizontal through holes of the plastic wheel fork 42, wherein each of the convex rings of the plastic wheel fork 42 has an inward convex of 1.5 mm, which corresponds to internal loops of the bearings at centers of both sides of the PU wheel 5.

The PU wheel 5 has a diameter of φ80 mm, comprising two mode 608 deep groove ball bearings at centers of both sides; a ring is provided between the PU wheel 5 and each of the deep groove ball bearings, and internal holes of the deep groove ball bearings at the centers of the PU wheel 5 is connected to the horizontal through holes of the insert plastic wheel fork 4 through a locking bolt.

Four the locking bolt screw barrels 412 of the insert plastic wheel fork 4 are inserted into four the lower bearings and four the upper bearings at the front ends and the rear ends of two the panels 2, and are screwed into the screw holes of the top portions of the locking bolt screw barrels 412 by flat base bolts of four the insert caps 6 for positioning.

The insert cap 6 comprises the plastic round cap, the flat base hex bolt, and a column stopper; the plastic round cap is a discus-shaped plastic round cap with a diameter of φ21 mm, and is injection-molded into a top head of a M6×16 mm flat base bolt; a top portion of the plastic round cap is spherical and extends upwards, and the round hole is drilled at the top portion of the plastic round cap in the up-down direction. The round hole corresponds to and communicates with a hex hole at the top head of the M6×16 mm flat base hex bolt. A diameter of the round hole of the plastic round cap is slight larger than the hex hole of the flat base hex bolt; a downward convex ring is provided at a bottom face of the plastic round cap, which extends downwards by 1 mm relative to a loop edge of the plastic round cap with the diameter of φ21 mm; the column stopper is a cylindrical plastic stopper, whose diameter equals to the diameter of the round hole of the plastic round hole; four the insert caps 6 are screwed into the screw holes of four pairs of the locking bolt screw barrels 412, and are placed at top portions of the front top side hole and the rear top side hole of the panel 2. The insert cap 6 is screwed with a threaded hole of the locking bolt screw barrel 412, and cooperates with the top side holes of the panel 2 to freely rotates; four the column stoppers are inserted into the round holes of the plastic round caps of four the insert caps 6.

What is claimed is:

1. A swing roller skate with a novel manufacturing process, comprising: an aluminum insert, a panel, an anti-wear bar, a lower bearing, an upper bearing, an insert plastic wheel fork, a polyurethane wheel and an insert cap, wherein: the aluminum insert is formed by bending an H-shaped aluminum profile into a U-shape and obliquely drilling a row of round through holes on a front end and a rear portion of a formed insert respectively along an up-down direction; an oblique direction of the round through holes on the front end and the rear portion of the aluminum insert forms a forward angle of 79.5° with a horizontal portion of the U-shape; then the aluminum insert is injection-molded into the panel; the panel is form by plastic injection molding; a front portion of the panel forms a pole; an upper cross section of the pole is semi-circular, and a lower cross section of the pole is a bottom half of a flat oval; the pole of the panel is curved and extends upwards; a front end of the panel is integrally connected to a vertical front cylinder which is smaller in a top and larger in a bottom; a front end of the pole of the panel, which is connected to the vertical front cylinder, is match-shaped with a larger front and a smaller rear; the pole at the front end of the panel obliques forwards with an angle of 79.5°; a front top side hole and a front bottom side hole are drilled at the front end of the panel, and a front through hole is provided between the front top side hole and the front bottom side hole; a rear portion of the panel is a flat cylinder vertically extending upwards; a front half of a horizontal cross section of the flat cylinder at the rear portion of the panel is semi-circular, and a rear half of the horizontal cross section is a rear half of the flat oval; a top end of the flat cylinder of the panel extends backwards and is integrally connected to a vertical rear cylinder which is smaller in a top and larger in a bottom; the vertical rear cylinder at a rear end of the panel obliques forwards with an angle of 79.5°; a rear top side hole and rear bottom side hole are drilled at the rear end of the panel, and a rear through hole is provided between the rear top side hole and the rear bottom side hole; a center connecting line of the front top side hole and the front bottom side hole, as well as a center connecting line of the rear top side hole and the rear bottom side hole, respectively form a forward angle of 79.5° with a circular bottom face of the panel; the circular bottom face is integrally connected to a middle portion of the panel between the pole and the flat cylinder; an oval hole is vertically drilled at two sides of a middle of the circular bottom face respectively, and an external bottom portion of the oval hole of the circular bottom face has a concave facing upwards; screw holes are provided at two ends of the concave, which respectively form a forward oblique with the circular bottom face of the panel with an angle of 79.5°; a first row of forward oblique through holes are drilled at a contacting area of the front end of the pole of the panel and the vertical front cylinder along the up-down direction, so as to correspond to the round through holes at the front end of the aluminum insert; a second row of forward oblique through holes are drilled at the rear portion of the circular bottom face of the panel, so as to correspond to the round through holes at the rear portion of the aluminum insert; a first stopper is inserted into each of the forward oblique through holes at the front end of the panel from top to bottom, and a second stopper is inserted into each of the forward oblique through holes at the rear portion of the circular bottom face of the panel from top to bottom; a first arc concave connecting edge is provided at a left side and a right side of a contacting area of the pole at the front end of the panel and the circular bottom face respectively, and a second arc concave connecting edge is provided at a left side and a right side of a contacting area of the flat cylinder vertically extending upwards at the rear portion of the panel and the circular bottom face respectively; an arc paved bevel is formed at a front side of a top portion of the flat cylinder vertically extending upwards at the rear portion of the panel; a left side and a right side of an upper circumference of the circular bottom face of the panel are arc-edged; a lower circumference of the circular bottom face of the panel is arc-edged; an upper circumference and a lower circumference of the oval hole of the circular bottom face of the panel are arc-edged; a front side, a left side and a right side of a top face of the vertical front cylinder at the front end of the panel are arc-edged; a rear side, a left side and a right side of a top face of the vertical rear cylinder at the rear end of the panel are arc-edged; a front side, a left side and a right side of a bottom face of the vertical front cylinder at the front end of the panel are arc-edged; a rear side, a left side and a right side of a bottom face of the vertical rear cylinder at the rear end of the panel are arc-edged; anti-slip grains are arranged around a top side of the oval hole of the circular bottom face of the panel, which are conical; the anti-wear bar is a bar-shaped nylon unit, and a connecting through hole is drilled and upwardly provided at two ends of the anti-wear bar; two the anti-wear bars are fixed by four screw holes at the concave of the external bottom portion of the oval hole of the panel through four self-tapping bolts; the lower bearing is a first deep groove ball bearing, and the upper bearing is a second deep groove ball bearing; two the lower bearings are respectively embedded in the front top side hole and the rear top side hole of the panel; the insert plastic wheel fork comprises a wheel fork insert and a plastic wheel fork; the wheel fork insert is formed by a metal wheel fork and a locking bolt screw barrel; the metal wheel fork is formed by stamping a flat metal strip into an n-shape; two opposite through holes with a diameter of 8 mm are drilled at side faces of two bottom ends of the metal wheel fork; the bottom ends of the metal wheel fork are round-cornered; a top portion of the metal wheel fork is welded on the locking bolt screw barrel by spot welding, which is then reinforced by argon arc welding; a diameter of the locking bolt screw barrel is 8 mm; after being welded with the metal wheel fork, an axis of the locking bolt screw barrel is 27 mm away from a connecting line of the opposite through holes of the bottom ends of the metal wheel fork; the metal wheel fork of the wheel fork insert is injection-molded in the plastic wheel fork, and a pole of the locking bolt screw barrel of the wheel fork insert is fully exposed outside the plastic wheel fork; the plastic wheel fork is connected to the wheel fork insert by injection molding, wherein a top face of a top portion of the plastic wheel fork is spherical and extends upwards, and a bottom face of the top portion of the plastic wheel fork is n-shaped; two sides of the plastic wheel fork extend downwards and are integrally connected to two fork pieces which are slightly wider in a top and slightly narrower in a bottom, and the fork pieces are arc faces extending outwards; a bottom end of the fork pieces of the plastic wheel fork is a downward semicircle whose external edge is round-cornered; two horizontal holes are drilled at external sides of the bottom ends of the fork pieces of the plastic wheel fork, which inwardly communicate with two horizontal through holes; a center connecting line of the horizontal through holes of the plastic wheel fork is perpendicular to an axis extension cord of the locking bolt screw barrel of the wheel fork insert; two convex rings are provided at internal ends of the horizontal through holes of the plastic wheel fork; the polyurethane wheel comprises two bearings at centers of both sides, and is connected to the horizontal through holes of the insert plastic wheel fork through a locking bolt; four shafts of the insert plastic wheel fork are inserted into four the lower bearings and four the upper bearings at the front ends and the rear ends of two the panels, and are screwed into the screw holes of the top portions of the locking bolt screw barrels by flat base bolts of four the insert caps for positioning; the insert cap is formed by injection-molding a plastic round cap into a top head of a flat base hex bolt; a round hole is drilled at a center of a top portion of the insert cap, which corresponds to and communicates with a hex hole at the top head of the flat base hex bolt; four the insert caps are screwed into the screw holes of four pairs of the locking bolt screw barrels, and are placed at top portions of the front top side hole and the rear top side hole of the panel.

2. The swing roller skate, as recited in claim 1, wherein the H-shaped aluminum profile for the aluminum insert is an H-shaped aluminum extruding profile with a height of 9 mm and a width of 13 mm; the H-shaped aluminum profile has an upper groove, a lower groove and four round corners; a depth of both the upper groove and the lower groove of the H-shaped aluminum profile is 2.8 mm.

3. The swing roller skate, as recited in claim 1, wherein a front portion of the U-shape of the aluminum insert extends upwards and is arc-shaped, and a rear portion of the U-shape of the aluminum insert vertically extends upwards; a long hole is drilled at a top portion vertically extending upwards of the rear portion of the aluminum insert, which is placed in an upper groove and a lower groove of the aluminum insert; the aluminum insert injection-molded into the panel is placed at a longitudinal middle of the panel.

4. The swing roller skate, as recited in claim 1, wherein the front top side hole of the panel has a diameter of 22 mm and a depth of 9 mm; the front bottom side hole of the panel has a diameter of 24 mm and a depth of 8 mm; the front through hole is provided between the front top side hole and the front bottom side hole of the panel; the rear top side hole of the panel has a diameter of 22 mm and a depth of 9 mm; the rear bottom side hole of the panel has a diameter of 24 mm and a depth of 8 mm.

5. The swing roller skate, as recited in claim 1, wherein a top end of the first stopper inserted into each of the forward oblique through holes at the front end of the panel, and a top end of the second stopper inserted into each of the forward oblique through holes at the rear portion of the panel are leveled with a top surface of the panel.

6. The swing roller skate, as recited in claim 1, wherein circular convex ribs facing downwards are longitudinally provided at a middle of the circular bottom face of the panel, provided around a bottom side of the oval holes of the circular bottom face of the panel, as well as provided at a front end and a rear end of a bottom portion of the circular bottom face, which are connected to each other.

7. The swing roller skate, as recited in claim 1, wherein the anti-wear bar is formed by modified nylon injection molding; connecting through holes at a bottom face of the anti-wear bar correspond to the screw holes upwardly provided at the concave of the panel.

8. The swing roller skate, as recited in claim 1, wherein the metal wheel fork is formed by stamping a 3 mm×16 mm flat metal strip into the n-shape; an axial threaded hole is drilled at a middle at a top end of the locking bolt screw barrel, which is threaded hole.

9. The swing roller skate, as recited in claim 1, wherein internal sides of the two fork pieces of the plastic wheel fork are flat with an interval of 27 mm; a thickness between the internal side and an external side of each of the fork pieces is 7 mm.

10. The swing roller skate, as recited in claim 1, wherein the horizontal holes at the external sides of the bottom ends of the fork pieces of the plastic wheel fork have a diameter of 13.5 mm; the horizontal through holes of the plastic wheel fork has a diameter of 8 mm; the center connecting line of the horizontal through holes of the plastic wheel fork is 27 mm away from and is behind the axis extension cord of the locking bolt screw barrel.

11. The swing roller skate, as recited in claim 1, wherein each of the fork pieces has a thicker front and a thinner rear to form a wedge shape for mold releasing; the bottom face of the top portion of the plastic wheel fork is n-shaped and is lower in a front and higher in a rear; each of the convex rings of the plastic wheel fork has an inward convex of 1.5 mm, which corresponds to internal loops of the bearings at centers of both sides of the polyurethane wheel.

12. The swing roller skate, as recited in claim 1, wherein the insert cap comprises the plastic round cap, the flat base hex bolt, and a column stopper; the plastic round cap is a discus-shaped plastic round cap with a diameter of 21 mm, and is injection-molded into a top head of a 16 mm flat base bolt; a top portion of the plastic round cap is spherical and extends upwards, and the round hole is drilled at the top portion of the plastic round cap in the up-down direction.

13. The swing roller skate, as recited in claim 12, wherein a diameter of the round hole of the plastic round cap is slight larger than the hex hole of the flat base hex bolt; a downward convex ring is provided at a bottom face of the plastic round cap, which extends downwards by 1 mm relative to a loop edge of the plastic round cap with the diameter of 21 mm; the column stopper is a cylindrical plastic stopper, whose diameter equals to the diameter of the round hole of the plastic round hole; the insert cap is screwed with a threaded hole of the locking bolt screw barrel, and cooperates with the top side holes of the panel to freely rotates; four the column stoppers are inserted into the round holes of the plastic round caps of four the insert caps.

\* \* \* \* \*